United States Patent
Bay et al.

(10) Patent No.: US 7,609,021 B2
(45) Date of Patent: Oct. 27, 2009

(54) METHOD AND ARRANGEMENT FOR MONITORING SIGNALS

(75) Inventors: Wolfgang Bay, Frankfurt (DE); Michael Henninger, Kelkheim (DE); Sven Kretschmar, Gustavsburg (DE)

(73) Assignee: Siemens VDO Automotive AG, Regensburg (DE)

( * ) Notice: Subject to any disclaimer, the term of this patent is extended or adjusted under 35 U.S.C. 154(b) by 29 days.

(21) Appl. No.: 11/922,163

(22) PCT Filed: Jun. 13, 2006

(86) PCT No.: PCT/EP2006/063113

§ 371 (c)(1),
(2), (4) Date: Mar. 10, 2008

(87) PCT Pub. No.: WO2006/136507

PCT Pub. Date: Dec. 28, 2006

(65) Prior Publication Data

US 2009/0045763 A1     Feb. 19, 2009

(30) Foreign Application Priority Data

Jun. 20, 2005   (DE) ...................... 10 2005 028 477

(51) Int. Cl.
*G05B 11/28* (2006.01)

(52) U.S. Cl. ..................... 318/599; 318/811; 388/907.5

(58) Field of Classification Search ................. 318/599, 318/811, 432, 434; 388/804, 811, 829, 907.5
See application file for complete search history.

(56) References Cited

U.S. PATENT DOCUMENTS

| | | | | |
|---|---|---|---|---|
| 4,963,801 | A * | 10/1990 | Yamazaki | 318/400.09 |
| 6,784,710 | B2 * | 8/2004 | Andersen et al. | 327/172 |
| 2005/0025231 | A1 * | 2/2005 | Mitsuki | 375/238 |
| 2005/0134343 | A1 * | 6/2005 | Goto et al. | 327/175 |
| 2007/0035976 | A1 | 2/2007 | Sader | |

FOREIGN PATENT DOCUMENTS

| | | |
|---|---|---|
| JP | 7-322643 | 12/1995 |
| JP | 07322643 | 12/1995 |
| JP | 2001-309669 | 11/2001 |
| JP | 2001309669 | 11/2001 |
| WO | WO 2004/105206 | 12/2004 |

* cited by examiner

*Primary Examiner*—Rina I Duda
(74) *Attorney, Agent, or Firm*—Cohen Pontani Lieberman & Pavane LLP

(57) ABSTRACT

The invention relates to a method and to an arrangement for monitoring signals which are guided to a multi-phase motor by an end stage and the pulse width thereof is controlled by a controller. The total of the pulse widths of the signals of each phase is measured by, respectively, a counter, respectively for a predetermined program flow in the controller. The meter reading is read by a counter according to a predetermined period of time and an error signal is produced if the total amount of time exceeds a predetermined tolerance range.

12 Claims, 3 Drawing Sheets

METHOD AND ARRANGEMENT FOR MONITORING SIGNALS

The invention relates to a method and an arrangement for monitoring signals which are supplied from an output stage to a multiphase motor and the pulse width of which is controlled by a controller.

It is necessary, in particular for safety-relevant applications in motor vehicles, for example for electrically assisted steering, to detect any fault which may result in a hazardous state. In the case of electrically assisted steering systems, DC or EC motors which are controlled via an H bridge or a B6 bridge by applying pulse-width-modulated signals to the half-bridges are used to provide assistance. The semiconductor switching elements, usually MOSFETS, are driven by a control device (microcontroller or digital signal processor). In order to detect faults, it is necessary to continuously monitor the RMS voltages applied to the output.

WO 2004/105206 A1 has disclosed a method and an arrangement for monitoring a power output stage, the respective pulse width of signals present at the output being compared with a respective desired pulse width and the power output stage being identified as being fault-free if discrepancies do not exceed a predefined level. In this case, the measurement of the pulse widths and the comparison are carried out with the aid of a control device which also derives the control signals for the output stage and is generally formed by a controller. However, the required synchronicity between the monitoring of the output stage and the pulse width modulation is not ensured in such controllers, particularly if there is a high level of utilization, for example caused by a high occurrence of interrupts.

It is an object of the present invention to reliably ensure that signals are monitored even when a controller is utilized to a great extent to generate the control signals.

In the case of the method according to the invention, this object is achieved by virtue of the fact that the sum of the pulse widths of the signals for each phase is respectively measured using a respective counter for a predefined amount of time that is independent of the program sequence in the controller, that the counter reading is read from the counter after the predefined amount of time, and that a fault signal is generated if the total amount of time is outside a predefined tolerance range.

In order to measure the pulse widths, a first embodiment of the method according to the invention provides for the signals to be combined with a gate pulse and to be supplied to the counter which is clocked at a considerably higher frequency than the frequency of the signals, and for the gate pulse to be generated by a timer which receives the predefined amount of time from the controller in the form of a numerical value.

A second embodiment involves the signals being supplied to a respective counter, and the counters being enabled for the duration of a gate pulse which is generated by a timer.

In order to take into account the pulse width modulation of the signals, the method according to the invention may also provide for the predefined tolerance range to depend on the pulse width predefined by the controller. The effects of propagation and switching times of the signals in the region of the output stage can be reduced by changes in the pulse width from the control circuit to the motor being taken into account in the dependence of the tolerance range on the predefined pulse width.

The method according to the invention may provide for the predefined amount of time to be predefined by the controller. This makes it possible to optimize the predefined amount of time with respect to different operating states or other circumstances.

The method according to the invention can be designed in such a manner that the gate pulse is asynchronous with respect to the pulses and has a length of an integer multiple of the period duration of the pulses, or that the gate pulse is in synchronism with the pulses and has a length of a plurality of period durations of the pulses.

In the case of an arrangement according to the invention, the object is achieved by virtue of the fact that a clocked counter which measures the sum of the pulse widths of the signals inside a predefined amount of time that is independent of the program sequence in the controller is provided for each phase, and that provision is also made of means which read the counter reading of the counters after the predefined amount of time and generate a fault signal if the counter reading is outside a predefined tolerance range.

One advantageous arrangement of this configuration is that the signals of a phase can be supplied to a respective counter via a respective gate circuit, the gate circuit being controlled using a gate pulse which is generated by a timer and the width of which corresponds to the predefined amount of time, and that the counters are clocked at a higher frequency than the frequency of the signals and are enabled using the signals which pass through the gate circuits.

Another advantageous configuration of the arrangement according to the invention provides for the signals to be applied to inputs of the counters, for a timer to be provided for the purpose of generating a gate pulse whose width corresponds to the predefined amount of time, and for the gate pulse to be able to be supplied to further inputs of the counters in order to enable the counters.

The arrangement according to the invention may also be designed in such a manner that the counters and the timer form an integrated circuit with the controller.

One advantageous refinement provides for the counters to be hardware counters and for the timer to contain a hardware counter. However, provision may also be made for the counters and the timer to be formed by a programmable device or by a mask-programmed circuit.

In the invention, it is assumed per se that the counter reading is compared with the tolerance range in the controller. However, in the invention, it is also possible for a comparator which compares the counter reading with a tolerance range supplied by the controller after the predefined amount of time and transmits a fault signal to the controller in the event of a discrepancy to be provided outside the controller.

The invention permits numerous embodiments. Four of them are diagrammatically illustrated in the drawing using a plurality of figures and are described below. In the drawing.

Figure 1:
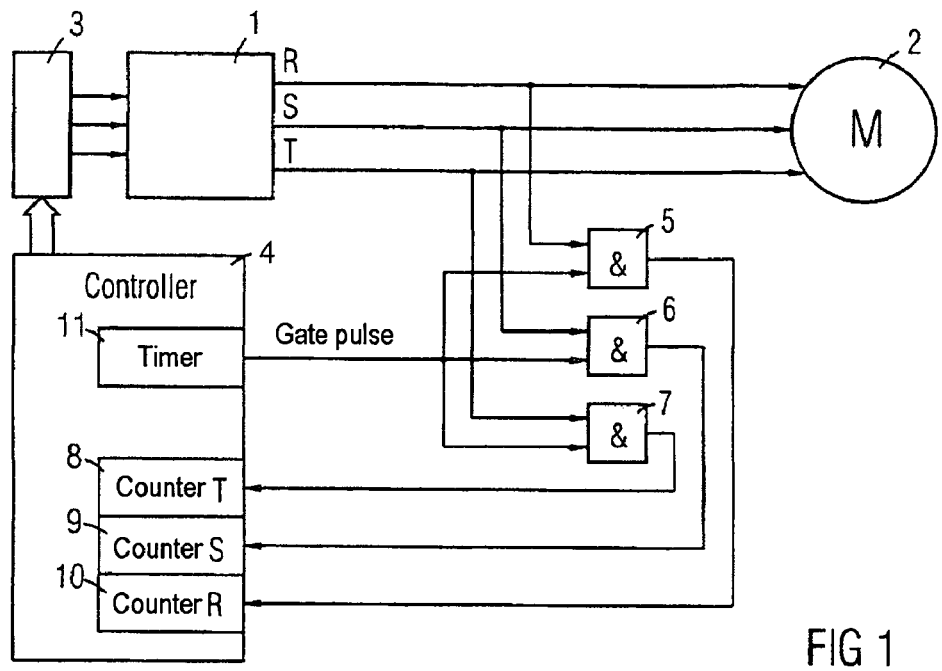
FIG. 1 shows a block diagram of a first exemplary embodiment.

In the exemplary embodiment according to FIG. 1, outputs of a three-phase output stage 1 are connected to windings of a motor 2. The output stage is controlled by a controller 4 via a drive stage 3. Depending on the application of the arrangement according to the invention, the controller 4 is connected to sensors (not illustrated), for example to a sensor which measures the position of the steering wheel and calculates the required control of the motor 2 from the sensor inputs.

For monitoring purposes, the signals in each of the three phases R, S, T are supplied to a respective hardware counter 8, 9, 10—also referred to as counter below—via AND gates 5, 6, 7. The counters count the clock pulses whose frequency is considerably higher than that of the signals to be measured during a predefined amount of time supplied to the AND gates 5 to 7 in the form of a gate pulse by a further hardware counter 11. The counters 8, 9, 10—usually also referred to as timers—count clock pulses, while the supplied signals assume the logic level denoted by 1 in FIG. 2a).

Figure 2:
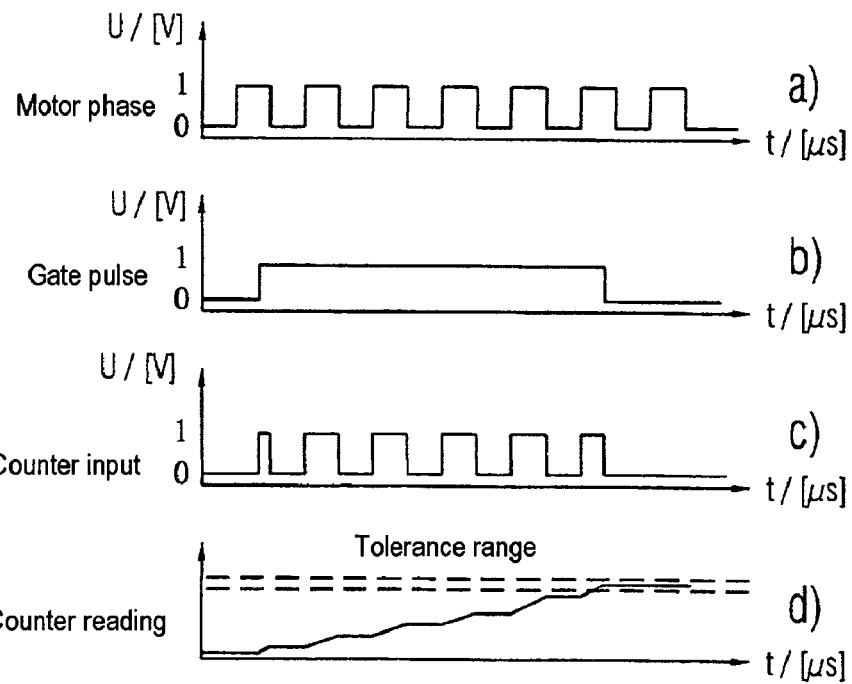
FIG. 2 shows timing diagrams of signals which occur in the invention.

FIGS. 2a) and 2b) illustrate the signals in a respective motor phase and the gate pulse. The signals illustrated in FIG. 2c) are produced as a result of the combination in the AND gates 5 to 7 and are then supplied to the respective counter 8, 9, 10. In the case of the perfect profile of the signals which is shown in FIG. 2d), the counter reading reaches a value inside a tolerance range which is illustrated using dashed lines in FIG. 2d). If the counter reading does not reach this tolerance range or exceeds it, a fault message is output.

Figure 3:
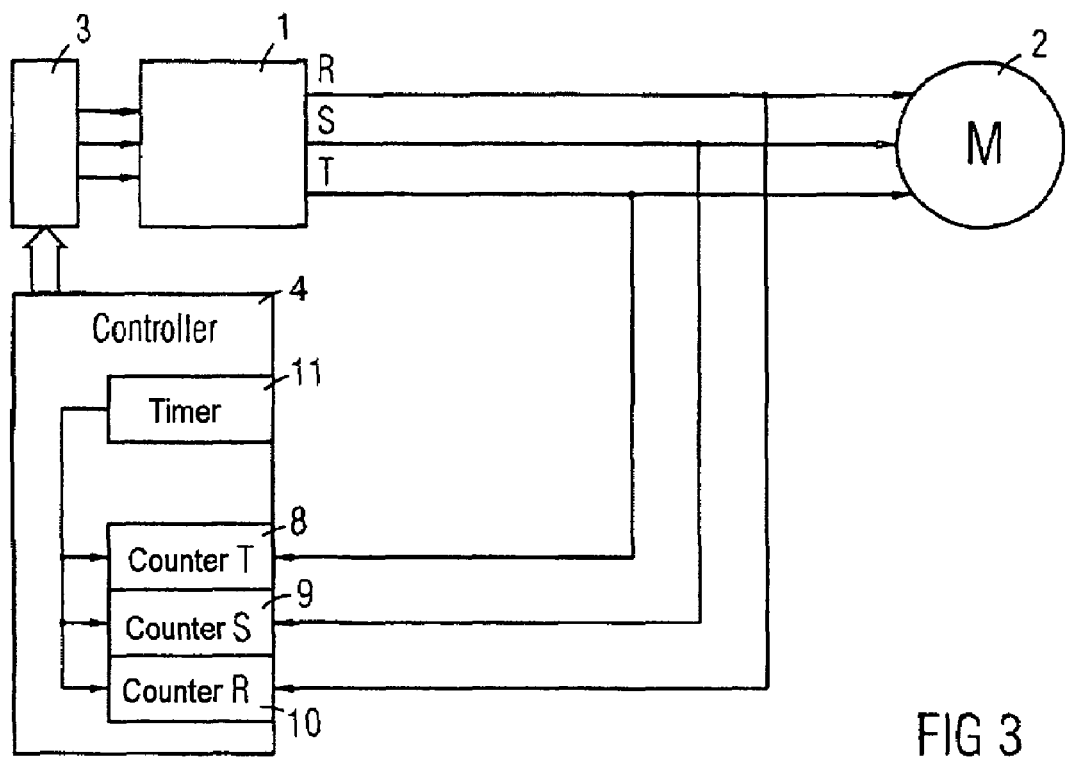
FIG. 3 shows a block diagram of a second exemplary embodiment.

In the exemplary embodiment illustrated in FIG. 3, the signals to be monitored are directly supplied to the counters 8, 9, 10. The gate pulse generated by the further counter 11 is passed to the counters 8, 9, 10, as a result of which the counters 8, 9, 10 are enabled only for the duration of the gate pulse.

Figure 4:
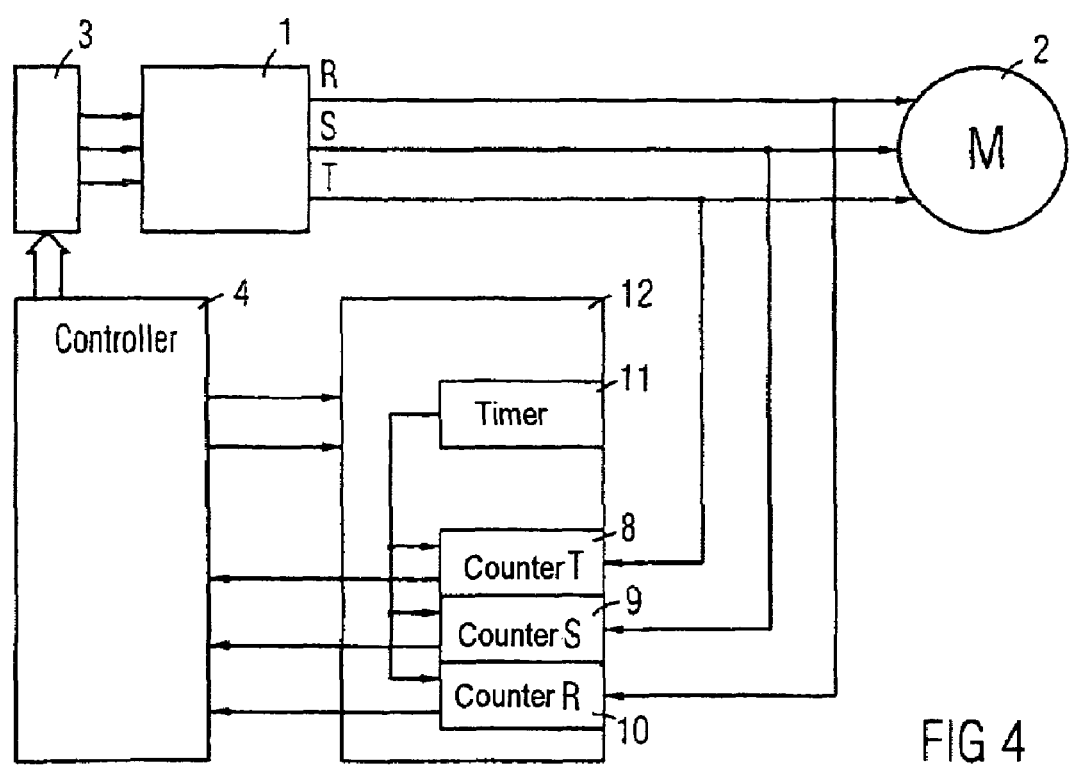
FIG. 4 shows a block diagram of a third exemplary embodiment.

In the exemplary embodiment according to FIG. 4, the timer 11 and the counters 8, 9, 10 are implemented in a separate circuit 12 either in the form of a processor or an ASIC. The controller 4 sets the timer 11 to the predefined amount of time. The controller 4 issues a command to read the counter readings at the earliest after the predefined amount of time has elapsed, whereupon said counter readings are transmitted to the controller 4.

Figure 5:
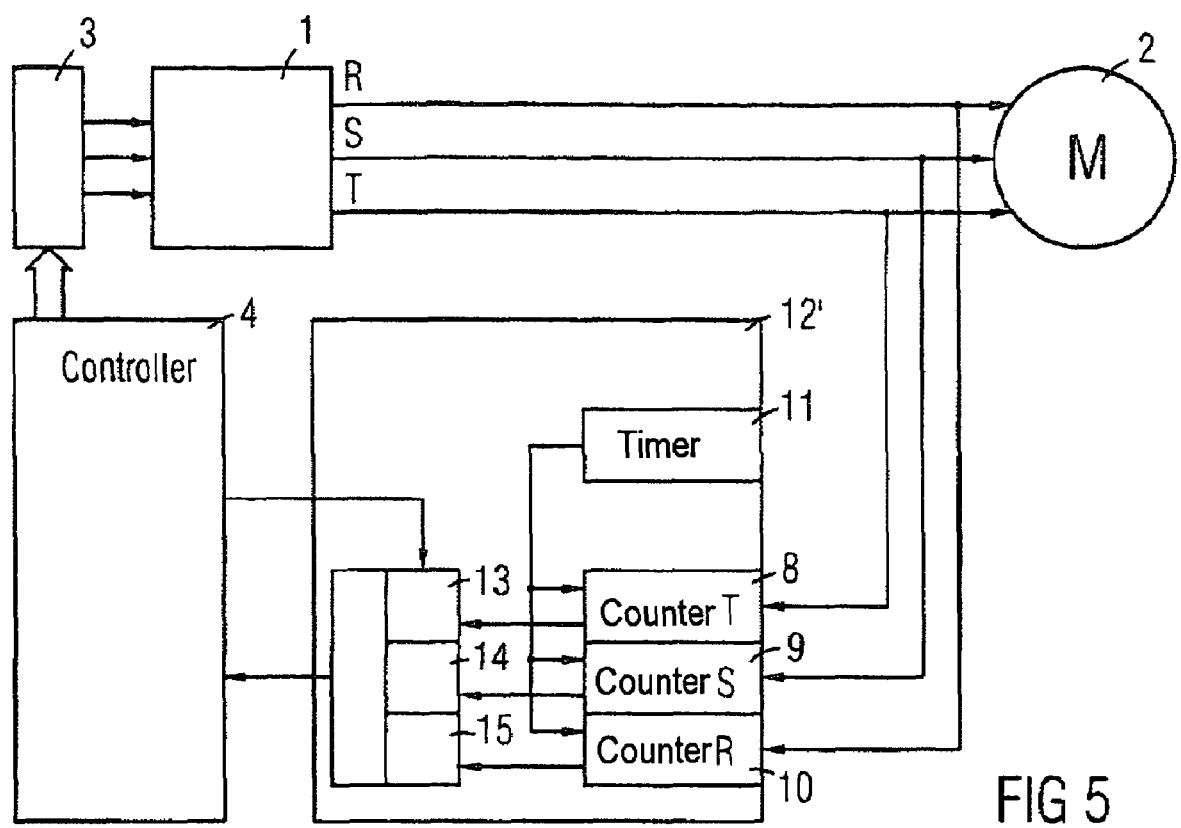
FIG. 5 shows a block diagram of a fourth exemplary embodiment.

In the exemplary embodiment according to FIG. 5, a respective comparator 13, 14, 15 for the counters 8, 9, 10 is also arranged in the circuit 12'. The controller 4 then writes only the tolerance range into the comparators 13, 14, 15 of the circuit 12'. If the counter reading goes outside the tolerance range, the relevant comparator 13, 14, 15 outputs a fault signal.

The invention claimed is:

1. A method of monitoring signals which are supplied from an output stage to a multiphase motor, the pulse width of the signals being controlled by a controller, the method comprising the steps of:
   generating, by a timer, a gate pulse;
   measuring, within a predetermined time period corresponding to the gate pulse, a sum of the pulse widths for each phase of the signals which are supplied from an output stage to a multiphase motor, the step of measuring being performed independently of a program sequence in the controller which controls the signals, said measuring comprising one of:
   combining each of the signals with the gate pulse, sending the combined signals to respective counters, and reading the counters after the predetermined amount of time; or
   sending each of the signals to respective counters, sending the gate pulse to the counters, enabling the counters for the duration of the gate pulse; and
   generating a fault signal if the measured sum is outside a predetermined tolerance range.

2. The method of claim 1, wherein the predefined tolerance range depends on the pulse width designated by the controller.

3. The method of claim 2, wherein changes to the pulse width by the control circuit are accounted for in the predetermined tolerance range.

4. The method of claim 1, wherein the predetermined amount of time is defined by the controller.

5. The method of claim 1, wherein the gate pulse is asynchronous with respect to the pulses of the signals and has a length of an integer multiple of the period duration of the pulses.

6. The method of claim 1, wherein the gate pulse is synchronous with the pulses of the signals and has a length equal to a plurality of period durations of the pulses.

7. An arrangement for monitoring signals which are supplied from an output stage to a multiphase motor, comprising:
   a controller controlling the pulse width of pulses in signals supplied to a multiphase motor;
   counters measuring a sum of pulse widths of the pulses in respective ones of the signals supplied to the multiphase motor for a predetermined amount of time;
   a timer generating a gate pulse corresponding to the predetermined amount of time, the gate pulse being connected to one of a gate circuit for controlling the gate circuit to pass the signals to the counters for the duration of the gate pulse, or the counters for enabling the counters for the duration of the gate pulse,
   means for reading the counters and generating a fault signal if the counter reading is outside of a predetermined tolerance range.

8. The arrangement of claim 7, wherein the counters and timer form an integrated circuit with the controller.

9. The arrangement of claim 7, wherein the counter and the timer each comprise a hardware counter.

10. The arrangement of claim 7, wherein the counter and timer are part of a programmable device.

11. The arrangement of claim 7, wherein the counter and timer are part of a mask-programmed circuit.

12. The arrangement of claim 7, further comprising a comparator which compares the counter reading with a tolerance range determined by the controller, said comparator generating a fault signal if the counter reading is outside of the tolerance band.

* * * * *